United States Patent
Lewis

(10) Patent No.: US 8,918,907 B2
(45) Date of Patent: Dec. 23, 2014

(54) APPROACHES FOR FIRMWARE TO TRUST AN APPLICATION

(75) Inventor: Timothy A. Lewis, El Dorado Hills, CA (US)

(73) Assignee: Phoenix Technologies Ltd., Campbell, CA (US)

( * ) Notice: Subject to any disclaimer, the term of this patent is extended or adjusted under 35 U.S.C. 154(b) by 489 days.

(21) Appl. No.: 13/085,992

(22) Filed: Apr. 13, 2011

(65) Prior Publication Data

US 2012/0266259 A1  Oct. 18, 2012

(51) Int. Cl.
G06F 21/20 (2006.01)
G06F 21/51 (2013.01)

(52) U.S. Cl.
CPC ...................................... G06F 21/51 (2013.01)
USPC .................. 726/30; 726/26; 726/27; 713/176

(58) Field of Classification Search
CPC .............. H04N 2201/3233; H04N 2201/3235; H04N 2201/3236; H04N 2201/3239; H04N 21/835; H04N 21/8352; H04N 21/8355; H04N 21/8358; H04L 9/3247; H04L 9/3249; H04L 9/3252; H04L 9/3255; H04L 9/3257; H04L 63/12; G06F 21/10; G06F 21/12; G06F 21/121; G06F 21/126; G06F 21/30; G06F 21/44; G06F 21/445; G06F 21/50; G06F 21/52; G06F 21/54; G06F 21/56; G06F 21/566; G06F 21/57; G06F 21/572; G06F 21/577; G06F 21/64
USPC .................................. 726/26, 27, 30; 713/176
See application file for complete search history.

(56) References Cited

U.S. PATENT DOCUMENTS

| | | | | |
|---|---|---|---|---|
| 5,892,904 | A | * | 4/1999 | Atkinson et al. ................. 726/22 |
| 6,209,099 | B1 | * | 3/2001 | Saunders ......................... 726/22 |
| 7,657,897 | B2 | | 2/2010 | Huang et al. |
| 7,890,771 | B2 | * | 2/2011 | England et al. ............... 713/193 |
| 8,832,454 | B2 | * | 9/2014 | Khosravi et al. .............. 713/187 |
| 2002/0133702 | A1 | * | 9/2002 | Stevens .......................... 713/163 |
| 2003/0188173 | A1 | * | 10/2003 | Zimmer et al. ............... 713/189 |
| 2003/0226031 | A1 | * | 12/2003 | Proudler et al. .............. 713/200 |
| 2007/0156638 | A1 | * | 7/2007 | Vadekar et al. .................... 707/1 |
| 2010/0058317 | A1 | * | 3/2010 | Braams ......................... 717/171 |
| 2010/0107249 | A1 | * | 4/2010 | Krig ................................. 726/22 |
| 2010/0174631 | A1 | * | 7/2010 | Tian et al. ....................... 705/35 |
| 2010/0235646 | A1 | | 9/2010 | Fu et al. |
| 2011/0119358 | A1 | | 5/2011 | Woodward |
| 2012/0124567 | A1 | * | 5/2012 | Landry ........................ 717/168 |

\* cited by examiner

*Primary Examiner* — Joseph P Hirl
*Assistant Examiner* — Thomas Gyorfi
(74) *Attorney, Agent, or Firm* — Brokaw Patent Law PC; Christopher J. Brokaw

(57) ABSTRACT

Techniques for determining whether firmware should trust an application sufficiently so as to provide a service to the application. Firmware, executing on a device, receives an indication that an application, also executing on the device, is requesting a service provided by the firmware. The firmware obtains (a) an operating system signature associated with the application and (b) a firmware signature associated with the application. The operating system signature is a signature that is used by the operating system, executing on the device, to authenticate the application, while the firmware signature is a signature that is used by the firmware to authenticate the application. If the firmware determines that the operating system signature matches the firmware signature, then the firmware storing trust data that permits the application to access the service provided by the firmware. The firmware need not calculate a signature based on the in-memory image of the application.

20 Claims, 5 Drawing Sheets

APPROACHES FOR FIRMWARE TO TRUST AN APPLICATION

FIELD OF THE INVENTION

The present invention relates to approaches for firmware to determine whether an application should be trusted prior to providing service to the application.

BACKGROUND OF THE INVENTION

To obtain the maximum benefit of certain firmware services, it may be helpful or appropriate to have an application request the services provided by the firmware. In many cases, use of such firmware-provided services may raise security concerns. As an example, firmware services may be used to reformat portions of the firmware and change passwords or behavior of a computer. Since such requests should not automatically be granted, before the firmware provides data or services to an application, it would be helpful to verify that the application requesting data or services from the firmware is trusted or authorized to do so.

There are various types of known approaches for determining whether firmware should trust an application. In a first approach (the "embedded signature approach"), the interface to firmware requires that an application requesting data or services from the firmware provide a signature created using a private half of a public key pair. The firmware uses this signature to verify whether the requesting application is authorized and should be trusted. To make this determination, the firmware verifies that the signature is correct using the public half of the public key pair embedded in the BIOS. If the signature is verified, then the application is considered trusted. The particular public key pair to be used may be agreed upon by the firmware provider and the application provider.

It is recognized by the inventors that the embedded signature approach may, in some instances, be ineffectual for firmware. Code analysis may enable one to discover what signatures are trusted by the firmware, thereby enabling a malicious user to circumvent the protection afforded by use of such signatures. For example, it has been discovered by the inventors that, in certain situations, by transplanting a valid signed container from a trusted application into a malicious application, firmware can be deceived into concluding that the malicious application is the trusted application. This subterfuge can result in the firmware providing services to the malicious application.

According to a second approach for addressing this problem, (the "image analysis approach"), an entity that needs to verify whether an application is to be trusted compares an in-memory image of the application with an actual image of the executable for the application (such as the actual executable of the application resident on disk). If the in-memory version of the application matches the trusted image of the application, then the entity concludes that the in-memory version of the application should be trusted, and the entity processes requests from the application.

The problem with this approach in this particular context is that by the time the application requests a service from the firmware, the application has already started to execute. Therefore, the in-memory image of the requesting application will always be different than a trusted image (such as the on-disk image) of the application. As cryptographic approaches are very sensitive to minor changes between images, firmware cannot use the image analysis approach to verify whether an application is to be trusted, as cryptographic approaches will produce different signatures for an in-memory image of an application that has already begun execution and an image of the application that has not yet executed.

There are several reasons why cryptographic approaches will produce different signatures for in-memory images and on-disk images of an application. One reason is that in order to load an application into memory, the operating system typically performs modifications to the code to reflect the logical memory address at which the application is loaded. Similarly, the operating system modifies the in-memory image to refer to the addresses of functions and/or data located in DLL files or in the OS kernel. Further, applications often need to initialize internal global variables, such as those used in a runtime library, upon execution. As a result of these modifications and changes, the signature produced by cryptographic approaches for an application before the application executes will be different than the signature, produced using the same cryptographic approach, after the application begins execution.

Note also that a similar approach of having an application pass in an unmodified copy of itself, verifying the passed-in unmodified copy of the application, and then launching the unmodified copy of the application leads to the same problems described above, as the unmodified copy is just another type of "pre-defined" data, as a malicious party may use code analysis to discover what signatures are trusted by the firmware to create a malicious executable image which passes verification.

Discussion in this section is meant to provide an understanding of prior approaches to the reader as they relate to embodiments of the invention. However, the disadvantages of prior approaches discussed in this section are not meant to be an admission that such disadvantages were publically known. Consequently, recognition of the disadvantages of the prior art discussed herein is not meant to be construed as being within the prior art simply by virtue of its inclusion in this section alone.

SUMMARY OF THE INVENTION

Advantageously, embodiments of the invention enable firmware to determine whether an application should be trusted prior to providing services to the application in a manner which overcomes the limitations of prior art, including the embedded signature approach and the image analysis approach. Embodiments recognize that an operating system typically evaluates whether an application is to be trusted prior to allowing the application to execute. Therefore, firmware may decide that an application may be trusted if (a) the operating system has verified that a signature associated with an executable image of the application loaded into memory matches a signature of the image of the application stored on disk and (b) the signature of the image of the application stored on disk is verified as matching an application which the firmware has been notified as being trustworthy. Note that the firmware does not blindly trust any executing application, but instead, establishes a trust relationship with an executing application, based in part, upon the operating system deeming the specific executing application trustworthy.

In an embodiment, prior to execution of an application, two different signatures may be embedded in or associated with the application. One of these two signatures (denoted an "operating system signature") is created using an operating system private key, while the other of the two signatures (denoted a "firmware signature") is created using a firmware private key. Since the operating system signature and the firmware signature were created based on the same content (i.e., the original image of the application), both the signatures, when decrypted using the appropriate public key, should match.

Therefore, when firmware executing on a device receives an indication that an application is requesting services provided by the firmware, the firmware obtains the operating system signature and the firmware signature associated with the application. Prior to the firmware receiving the request from the application, the operating system would have already evaluated the operating system signature, and by virtue of the application being allowed to execute, it is presumed that the operating system verified that the signature of the application matched the OS signature. The firmware compares the firmware signature to the operating system signature to determine if the signatures match. If the firmware determines that the operating system signature matches the firmware signature, then the firmware concludes that the application is trustworthy and stores trust data that permits the application to access services provided by the firmware.

Advantageously, the firmware need not calculate a signature based on the in-memory image of the application, thereby avoiding the problems associated with the image analysis approach. Further, the cooperative trust model of embodiments involves both the operating system and the firmware, thereby rendering it more difficult to circumvent the protection afforded by the cooperative trust model. This is so because two separate authentication checks are performed, namely a first authentication check performing by the operating system using the operating system signature and a second authentication check performed by the firmware using the operating system signature and the firmware signature.

The approaches described herein are not meant to describe all the embodiments of the invention, as other embodiments of the invention may differ in their operation compared to the illustrative approaches discussed in this section.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION OF THE INVENTION

Approaches for determining whether firmware should trust an application sufficiently so as to provide services to the application are described. In the following description, for the purposes of explanation, numerous specific details are set forth in order to provide a thorough understanding of the embodiments of the invention presented herein. It will be apparent, however, that the embodiments of the invention presented herein may be practiced without these specific details. In other instances, well-known structures and devices are shown in block diagram form in order to avoid unnecessarily obscuring the embodiments of the invention presented herein.

Architecture Overview

Figure 1:
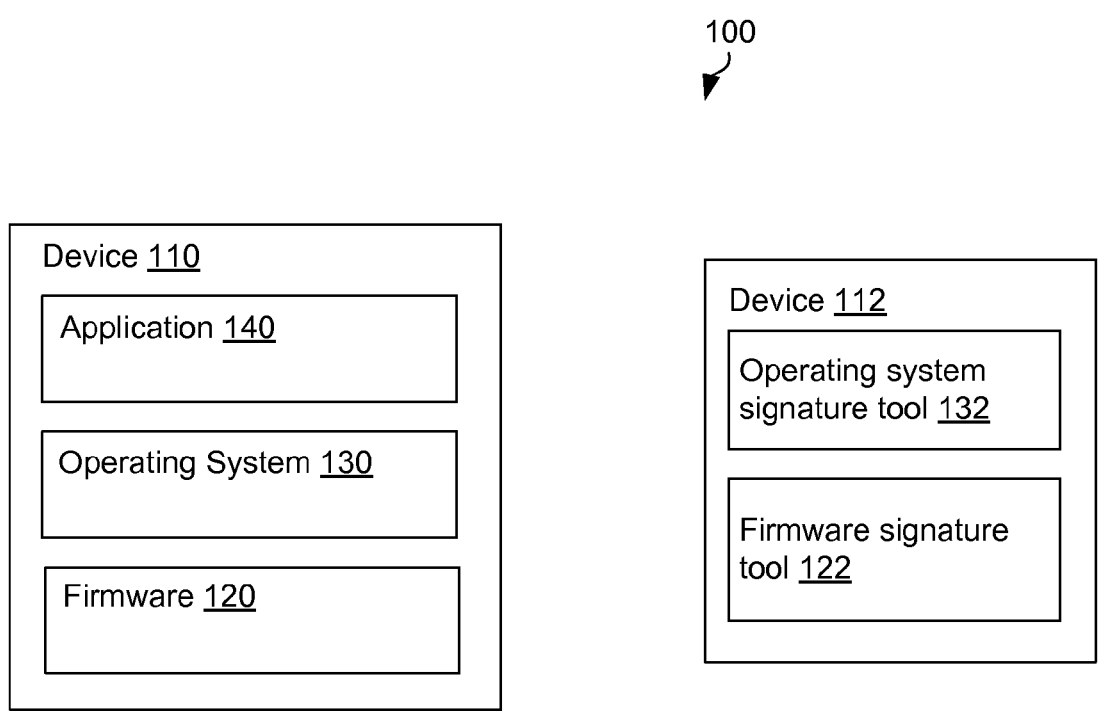
FIG. 1 is a high level block diagram of a system in which an embodiment of the invention may be implemented.

FIG. 1 is a high level block diagram of system 100 in which an embodiment of the invention may be implemented. As shown in FIG. 1, system 100 includes device 110. Device 110 is intended to represent a machine having which firmware which, according to an embodiment, may determine whether to trust an application prior to providing services to the application. Device 110, as broadly used herein, refers to any machine which is capable of executing firmware, an operating system, and an application. Non-limiting, illustrative examples of device 110 include a portable device (such as, for example, a laptop, a personal digital assistant (PDA), a cell phone, a game system (such as an Xbox available from Microsoft Corporation of Redmond, Wash. or a Playstation 3 available from Sony Corporation of Park Ridge, N.J.), or a tablet computer) and a personal computer (PC).

As depicted in FIG. 1, device 110 comprises firmware 120, operating system 130, and application 140. Firmware 120 represents the Basic Input-Output System (or BIOS) that initializes hardware resources and loads operating system 130. Non-limiting examples of firmware 120 include code implementing versions of the Unified Extensible Firmware Interface (UEFI) specification, such as SecureCore Tiano 2.x or SecureCore Tiano Enhanced, available from Phoenix Technologies, Ltd. of Milpitas, Calif.

Operating system 130, as broadly used herein, represents any type of operating system. As shall be explained below, operating system 130, after loading application 140 into memory, will perform an authentication process on the in-memory image of application 140 prior to allowing the in-memory image of application 140 to execute.

Application 140, as broadly used herein, represents any application which may request a service from firmware 120. In particular, application 140 may request a service from firmware 120 which may raise a security concern. For example, application may issue a request to firmware 120 that portions of the firmware be reformatted or that passwords or behavior of device 110 be changed.

FIG. 1 also depicts device 112. Device 112 represents a machine on which operating system signature tool 132 and firmware signature tool 122 may be implemented. For convenience, operating system tool 132 and firmware signature tool 122 are shown as being implemented on the same device, although in practical embodiments this need not be the case. Indeed, there may be multiple instances of operating system signature tool 132 or firmware signature tool 122 executing on one or more devices in certain embodiments. In typical embodiments, device 112 is implemented using a computer while operating system signature tool 132 and firmware signature tool 122 are implemented in software.

The functions performed by operating system signature tool 132 and firmware signature tool 122 shall be explained in more detail in the next section.

Creating Signed Applications

Figure 2:
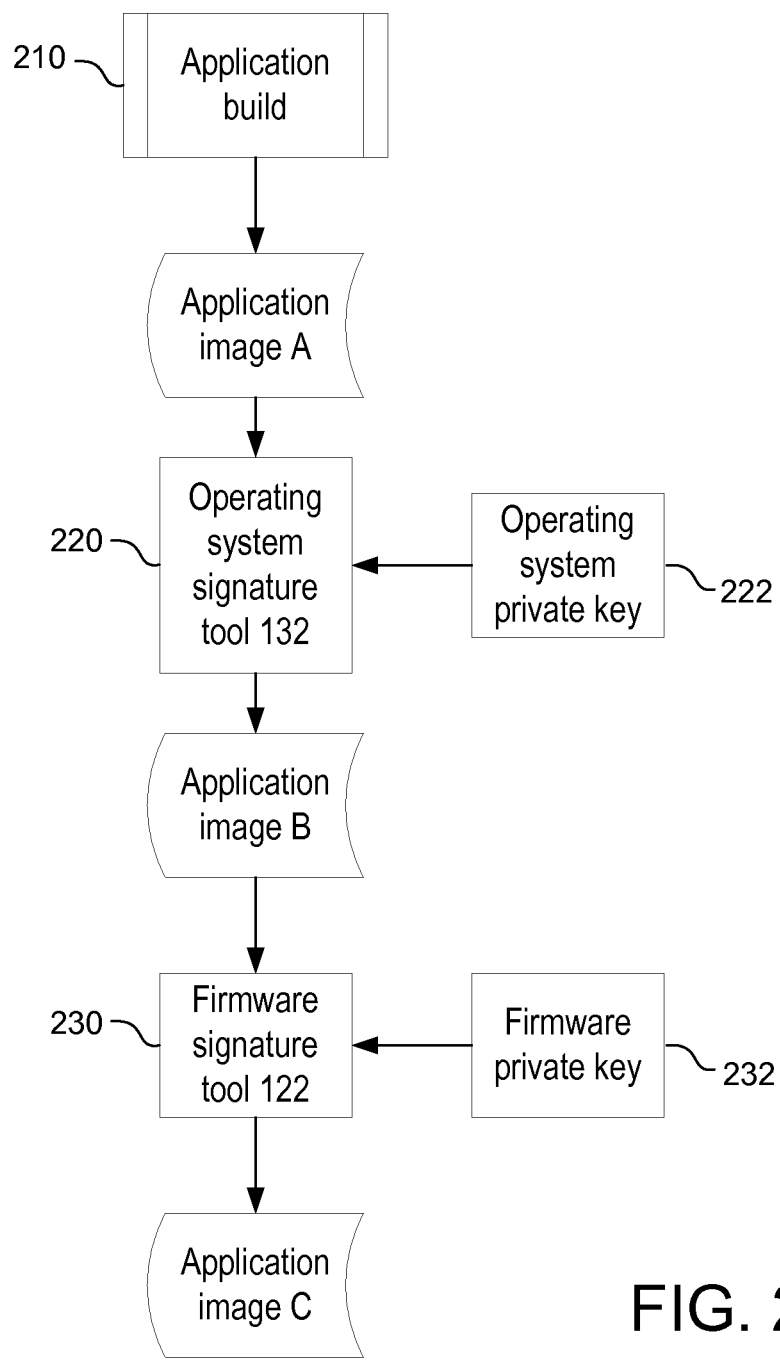
FIG. 2 is a flow chart illustrating the steps involved in creating an application that is signed according to an embodiment of the invention.

In an embodiment, prior to being deployed on device 110, application 140 is signed by two different digital signatures that are used by firmware 120 in determining whether firmware 120 should trust application 140. FIG. 2 is a flow chart illustrating the steps involved in signing application 140 with two different digital signatures according to an embodiment of the invention. For ease of explanation, the steps of FIG. 2 shall be discussed with reference to application 140; however, the steps of FIG. 2 may be generally applied to any number of applications on device 110.

In step 210, application 140 is designed and compiled to produce application image A. Application image A may be a PE/COFF executable or comparable format.

In step 220, operating system signature tool 132 is used to calculate a digital signature of application image A. Operating system signature tool 132 may create this digital signature (denoted an "OS signature"). In an embodiment, the OS signature is a cryptographically secure signature (such as a SHA-256 hash or signed SHA-256 hash) based on application image A. Operating system signature tool 132 may also encrypt this OS signature using operating system private key 22. Operating system private key 222 is a private half of an asymmetric key pair that is used only by the author of application 140 during the creation of application 140. Such a key might be generated using the algorithm described, for example, the RSA Laboratories' "RSA Cryptographic Standard."

After operating system signature tool 132 creates the OS signature of application image A, and optionally encrypts the signature using operating system private key 222, operating system signature tool 132 appends the OS signature to application image A using a signed container to create application image B. The signed container (referred to herein as an "operating system container") may be implemented using an X.509 certificate as described in the Microsoft Authenticode documentation, available from Microsoft Corporation of Redmond, Wash. In an embodiment, the signed container is discoverable as part of application image B.

Other embodiments may employ a Unified Extensible Firmware Interface (UEFI) WIN_CERTIFICATE structure to embed a signature into an image. The WIN_CERTIFICATE structure is a data structure which contains either the OS signature or the firmware signature for an application. The UEFI specification, developed by the Unified EFI Forum, defines an extensible form of WIN_CERTIFICATE in Chapter 27. In particular, section 27.2 of the UEFI specification shows the general process and section 27.2.2 shows an example of embedding a signature into an image.

Figure 3:
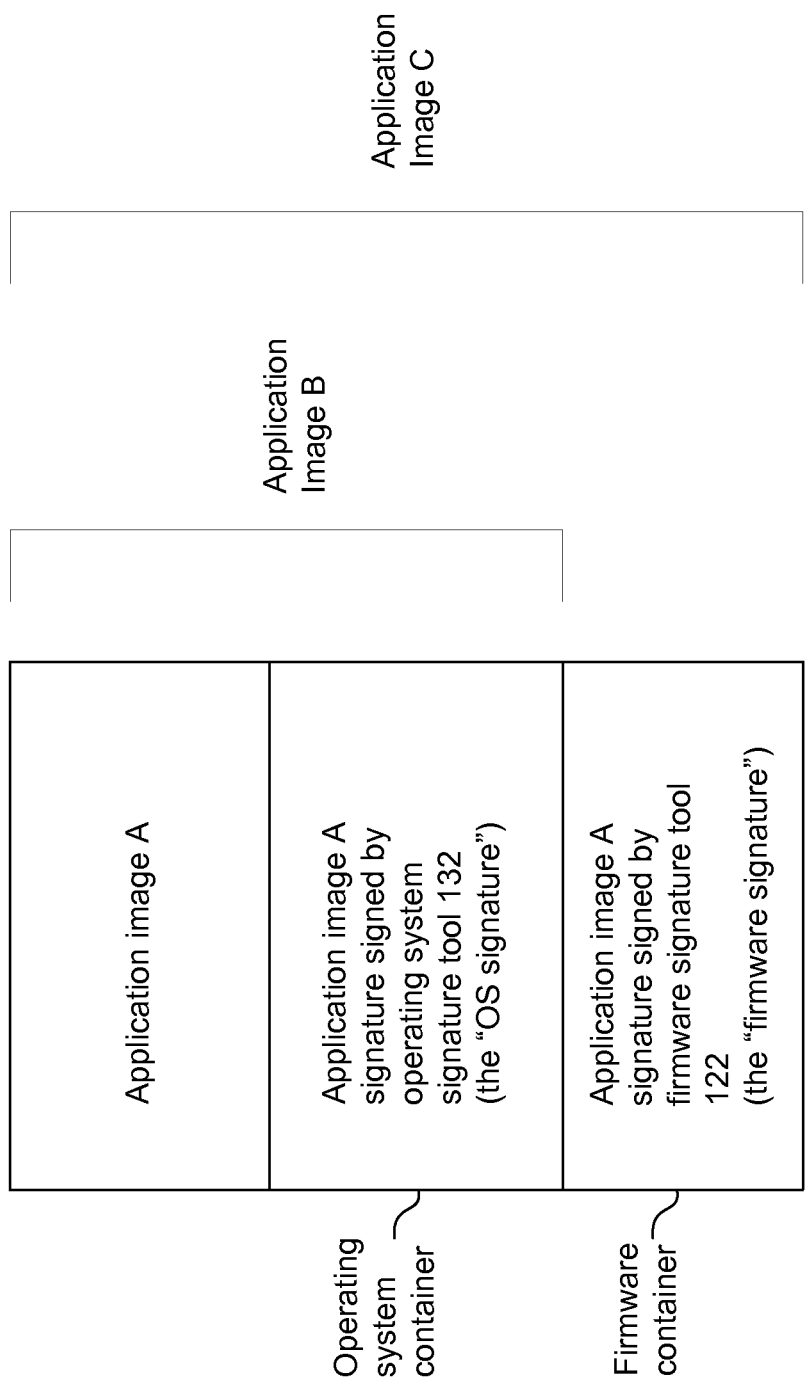
FIG. 3 which is an illustration of embedding an image of an application with signed containers according to certain embodiments of the invention.

To view a conceptual representation of application image A and application image B, consider FIG. 3, which is an illustration of embedding an image of an application with signed containers according to certain embodiments of the invention. FIG. 3 depicts application image A and additionally shows that application image B is composed of application image A and a digital signature of application image A that was signed using operating system signature tool 132.

Embedding the operating system container containing the OS signature into application image A to form application image B should not affect the subsequent calculation of a signature based on application image B. By including the operating system container in a special portion of the PE/COFF image, such as the Security Directory, the operating system container can be distinguished from the application image B's code and data.

In step 230, the firmware signature tool 122 is employed to calculate a firmware signature for application image A by signing application image A. The firmware signature may be implemented as a cryptographically secure signature (such as a SHA-256 hash or signed SHA-256 hash) based on application image A. The firmware signature may be encrypted using firmware private key 232. Firmware private key 232 may be implemented using a private half of an asymmetric key pair. Such a key might be generated using the algorithm described, for example, the RSA Laboratories' "RSA Cryptographic Standard."

Firmware signature tool 122 may append the encrypted firmware signature to the application image B in the form of a firmware signed container, the result of which is application image C. FIG. 3 depicts application image C. As shown in FIG. 3, application image C corresponds to (a) application image A, (b) the OS signature of application image A created using OS signature tool 132, and (c) the firmware signature of application image A created using firmware signature tool 122. Embedding the firmware container containing the firmware signature into application image B to form application image C should not affect the subsequent calculation of a signature based on application image C. By including the firmware container in a special portion of the PE/COFF image, such as the Security Directory, the firmware container can be distinguished from the application image C's code and data.

Application image C, once created, is installed or deployed on device 110. Thus, the on-disk image of application 140 is application image C. Therefore, the on-disk image of application 140 contains the operating system container and the firmware container. As a result, when application 140 is loaded into memory on device 110, the in-memory image of application 140 will also contain the operating system container and the firmware container.

The firmware signature of application image A should be transformable into a form where it may be compared with the OS signature of application image A. Typically, this involves a portion of the signature that uniquely identifies the application's image (such as a hash) be in the same format for both signatures.

Determining Whether Firmware should Trust an Application

Figure 4:
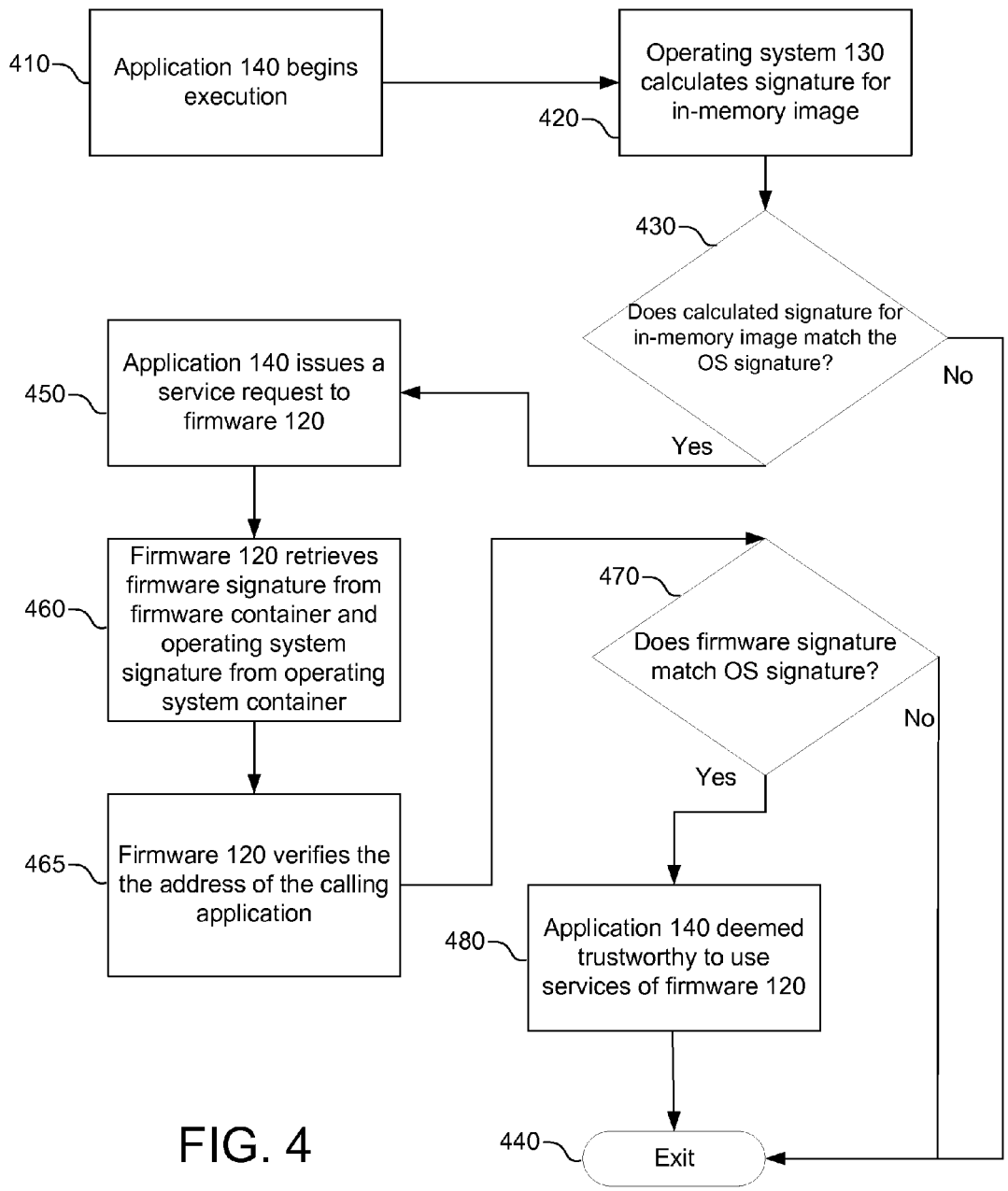
FIG. 4 is a flowchart illustrating the steps of firmware performing validation according to an embodiment.

FIG. 4 is a flowchart illustrating the steps performed by firmware 120 to determine whether application 140 should be trusted prior to providing services thereto according to an embodiment. In step 410, a user or other agent may launch application 140 to cause application 140 to begin execution. Consequently, application 140 is loaded into memory of device 110, thereby creating an in-memory image of application 140.

In step 420, operating system 130 calculates a signature (the "calculated signature for the in-memory image") of the in-memory image of application 140 using a cryptographically secure signature algorithm, such as SHA-256. The calculated signature for the in-memory image of application 140 is calculated before any modifications are made to the in-memory image of application 140. The cryptographically secure signature algorithm used in step 420 should be the same algorithm employed by operating system signature tool 132.

In step 430, operating system 130 extracts the operating system signature from the operating system container from the in-memory image of application 140. Therefore, operating system 130 determines if the operating system signature extracted from the operating system container matches the newly calculated signature for the in-memory image that was created in step 420.

If the operating system signature extracted from the operating system container does not match the newly calculated signature for the in-memory image that was created in step 420, then in step 440, firmware 120 concludes that application 140 is not trustworthy. As a result, firmware 120 will not execute any instructions from application 140.

On the other hand, if the operating system signature extracted from the operating system container does match the newly calculated signature for the in-memory image that was created in step 420, then in step 450, application 140 begins execution. During the execution of application 140, application 140 determines that it needs to access services provided by firmware 120. As a result, application 140 attempts to invoke the services provided by firmware 120.

Applicants 140 may request the invocation of a service from firmware 120 by entering system management mode (SMM). SMM is an operating mode in which all normal execution (including operating system 130) is suspended, and firmware 120 is executed in high-privilege mode. For this reason, SMM is considered to be reasonably secure. SMM may be entered by application 140 issuing a software management interrupt (SMI). In SMM, firmware 120 has full access to resources of device 110 and application 140 to enable firmware 120 to provide the service to application 140. Once firmware 120 has finished provided a requested service to application 140, firmware 120 will return control back to application 140. Other embodiments of the invention may employ other approaches for invoking the services of firmware 120.

The exact nature of the request issued from application 140 to firmware 120 is not pertinent to embodiments of the invention, as the request may be for any type of service provided by firmware 120. For example, the request issued from application 140 to firmware 120 may correspond to a request to access firmware-controlled configuration settings, a request to configure runtime behavior of device 110, or a request to shut down or power down device 110.

After application 140 has issued a request for service to firmware 120, in step 460, firmware 120, having received control from application 140, attempts to verify that application 140 is a trusted application. Firmware 120 scans the in-memory image of application 140 for the firmware container, and once found, extracts the firmware signature that was calculated and inserted in step 230 of FIG. 2. Firmware 120 also scans the in-memory image of application 140 for the operating system container, and once found, extracts the operating system signature that was calculated and inserted in step 220 of FIG. 2. In an embodiment, both the firmware container and the operating system container are located in the Security Direction portion of the PE/COFF executable.

In step 465, in an embodiment, firmware 120 validates that the service request issued in step 450 was generated from inside of the application image in memory. This verification step prevents an attack in a situation where the service request is generated by one application, but uses the signature of another application for purposes of gaining the firmware's trust. There are various means of determining that the service request was generated from inside of the application image in memory. For example, in a normal calling environment, one approach is to examine the return address on the stack and verify that it lies within the range of addresses specified to contain the application image in memory. In cases where the request is handled in system management mode (SMM), an approach that could be used is to examine the save content of the R/E/IP register in the CPU save state and verify that it lies within the range of addresses specified by the application's in-memory image.

In step 470, firmware 120 compares the firmware signature with the operating system signature. In an embodiment, firmware will deem application 140 untrustworthy, and subsequently refuse service to application, if any of the following is true: (a) firmware 120 cannot locate the operating system container or the firmware container, (b) the integrity of the firmware signature cannot be verified using the public key employed by firmware 120, and (c) the firmware signature does not match the operating system firmware. In an embodiment, in step 470, if firmware 120 determines that application 140 is not trustworthy, then firmware 120 may store trust data in a volatile or non-volatile medium to store the result of the determination of step 470. In this way, the stored trust data may be used to instruct firmware 120 to ignore or deny service requests for service from application 140 for a predetermined length of time.

However, if firmware 120 determines that the firmware signature does match the operating system signature, then in step 480, firmware 120 concludes that application 140 is trustworthy. Firmware 120 may store trust data in a volatile or non-volatile medium to store the determination that application 140 was deemed trustworthy. In this way, the stored trust data may be used to instruct firmware 120 to process service requests for service from application 140 for a predetermined length of time or for a predetermined number of further service requests.

In an embodiment, once application 140 is deemed trustworthy by firmware 120, application 140 may attempt to call services provided by firmware 120. To illustrate an example, application 140 may use a software-generated SMI, passing parameters either in CPU registers or in an agreed-upon memory buffer, to firmware 120. If trust data has been stored by firmware 120 that indicates application 140 is trustworthy, then the service request from application 140 to firmware 120 succeeds; otherwise, the service request may fail.

In an embodiment, application 140 may send to firmware 120 a notification that application 140 is finished using services provided by firmware 120. In response, firmware 120 may delete or update any trust data stored by firmware 120 for application 140 to prevent application 140 from subsequently accessing services provided by firmware 120 without going through the authentication process of FIG. 4 again.

An advantage provided by certain embodiments resides in the cooperative trust model that utilizes a first authentication check performed by the operating system using the operating system signature and a second authentication check performed by the firmware using the firmware signature. Embodiments take advantage of the fact that by the time an application is executing, the operating system has already performed one level of validation/authentication on the application. Thus, if the operating system signature was not valid, the application would not have been allowed to execute by the operating system. As a result, if the firmware signature contained in the firmware container matches the operating system signature contained in the operating system container and the firmware signature has been verified using a public key employed by the firmware, then the firmware may be assured that the in-memory image of the application is an application which is authorized for execution and deemed trustworthy by the firmware.

Implementing Mechanisms

Figure 5:
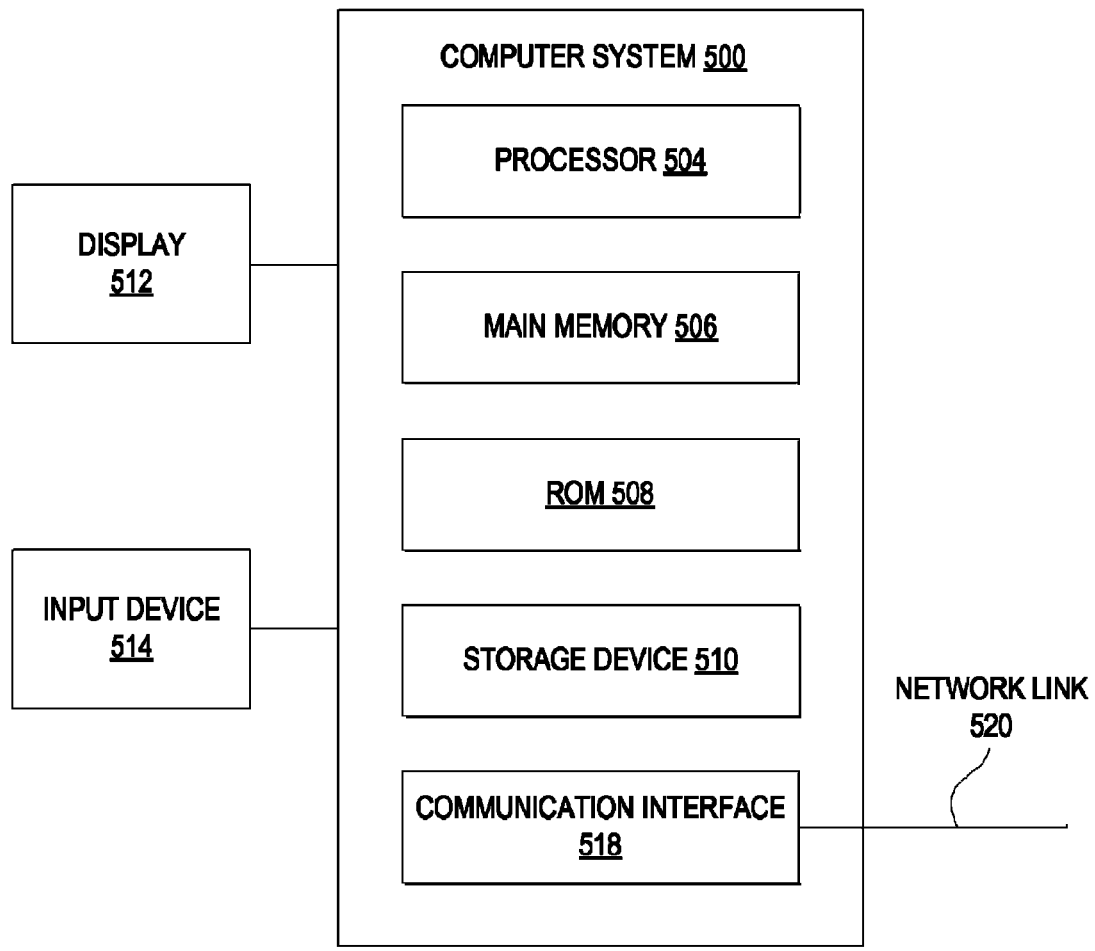
FIG. 5 is a block diagram that illustrates a computer system upon which an embodiment of the invention may be implemented.

In an embodiment, one or more of devices 110 and 112 may each be implemented using a computer system. FIG. 5 is a block diagram that illustrates a computer system 500 upon which an embodiment of the invention may be implemented. In an embodiment, computer system 500 includes processor 504, main memory 506, ROM 508, storage device 510, and communication interface 518. Computer system 500 includes at least one processor 504 for processing information. Computer system 500 also includes a main memory 506, such as a random access memory (RAM) or other dynamic storage device, for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device for storing static information and instructions for processor 504. A storage device 510, such as a magnetic disk or optical disk, is provided for storing information and instructions.

Computer system 500 may be coupled to a display 512, such as a cathode ray tube (CRT), a LCD monitor, and a television set, for displaying information to a user. An input device 514, including alphanumeric and other keys, is coupled to computer system 500 for communicating information and command selections to processor 504. Other non-limiting, illustrative examples of input device 514 include a mouse, a trackball, or cursor direction keys for communicating direction information and command selections to processor 504 and for controlling cursor movement on display 512. While only one input device 514 is depicted in FIG. 5, embodiments of the invention may include any number of input devices 514 coupled to computer system 500.

Embodiments of the invention are related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative embodiments, hard-wired circuitry may be used in place of or in combination with software instructions to implement embodiments of the invention. Thus, embodiments of the invention are not limited to any specific combination of hardware circuitry and software.

The term "machine-readable storage medium" as used herein refers to any medium that participates in storing instructions which may be provided to processor 504 for execution. Such a medium may take many forms, including but not limited to, non-volatile media and volatile media. Non-volatile media includes, for example, optical or magnetic disks, such as storage device 510. Volatile media includes dynamic memory, such as main memory 506.

Non-limiting, illustrative examples of machine-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other medium from which a computer can read.

Various forms of machine readable media may be involved in carrying one or more sequences of one or more instructions to processor 504 for execution. For example, the instructions may initially be carried on a magnetic disk of a remote computer. The remote computer can load the instructions into its dynamic memory and send the instructions over a network link 520 to computer system 500.

Communication interface 518 provides a two-way data communication coupling to a network link 520 that is connected to a local network. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through a local network to a host computer or to data equipment operated by an Internet Service Provider (ISP).

Computer system 500 can send messages and receive data, including program code, through the network(s), network link 520 and communication interface 518. For example, a server might transmit a requested code for an application program through the Internet, a local ISP, a local network, subsequently to communication interface 518. The received code may be executed by processor 504 as it is received, and/or stored in storage device 510, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A non-transitory machine-readable medium storing one or more sequences of instructions, which when executed, causes:

upon being instructed to execute an application, an operating system determining whether to permit execution of the application by (a) obtaining a first signature of an in-memory image of the application and (b) verifying that the first signature matches a second signature of a persistently stored image of the application;

upon firmware receiving from the application a request for a service provided by the firmware, the firmware determining whether the application should be trusted by (a) verifying that the request originated from the in-memory image of the application and (b) verifying that the second signature of the persistently stored image of the application corresponds to an application which the firmware has previously been notified as being deemed trustworthy;

upon the firmware determining that the application requesting the service from the firmware should be trusted, the firmware storing trust data that permits the application to access the service provided by the firmware; and upon the firmware determining that the application requesting the service from the firmware should not be trusted, the firmware denying performance of the service to the application.

2. The non-transitory machine-readable medium of claim 1, wherein execution of the one or more sequences of instructions further causes:

prior to the execution of the application, performing the steps of:
creating an operating system signature for the application, wherein the operating system signature is the second signature,
appending the operating system signature to a first image of the application using a first signed container that is signed by the operating system to create a second image of the application,
creating a firmware signature for the application,
appending the firmware signature to the second image of the application using a second signed container signed by the firmware to create a third image of the application; and
the firmware consulting the firmware signature to verify whether the application requesting the service from the firmware should be trusted.

3. The non-transitory machine-readable medium of claim 1, wherein the trust data further authorizes the application to access services provided by the firmware for a predetermined length of time or a predetermined number of subsequent service requests.

4. The non-transitory machine-readable medium of claim 1, wherein execution of the one or more sequences of instructions further causes:
in response to the firmware receiving a notification from the application that the application is finished using the service provided by the firmware, the firmware deleting the trust data to prevent the application from subsequently accessing the service provided by the firmware.

5. The non-transitory machine-readable medium of claim 1, wherein the firmware does not create either the first or second signature.

6. The non-transitory machine-readable medium of claim 1, wherein execution of the one or more sequences of instructions further causes:
upon the operating system successfully authenticating the operating system using the first signature, the operating system allowing the application to execute; and
upon the operating system determining that the operating system cannot be authenticated using the first signature or that the first signature is not present, the operating system preventing the application from executing.

7. The non-transitory machine-readable medium of claim 2, wherein the first and second signed containers are signed using X.509 certificates or Unified Extensible Firmware Interface (UEFI) WIN_CERTIFICATE structures.

8. A computer, comprising:
an application;
an operating system performing:
upon being instructed to execute the application, the operating system determining whether to permit execution of the application by (a) obtaining a first signature of an in-memory image of the application and (b) verifying that the first signature matches a second signature of a persistently stored image of the application; and
firmware performing:
upon the firmware receiving from the application a request for a service provided by the firmware, the firmware determining whether the application should be trusted by (a) verifying that the request originated from the in-memory image of the application and (b) verifying that the second signature of the persistently stored image of the application corresponds to an application which the firmware has previously been notified as being deemed trustworthy;
upon the firmware determining that the application requesting the service from the firmware should be trusted, the firmware storing trust data that permits the application to access the service provided by the firmware; and
upon the firmware determining that the application requesting the service from the firmware should not be trusted, the firmware denying performance of the service to the application.

9. The computer of claim 8, further comprising:
one or more software components, prior to execution of the application, performing:
creating an operating system signature for the application, wherein the operating system signature is the second signature,
appending the operating system signature to a first image of the application using a first signed container that is signed by the operating system to create a second image of the application,
creating a firmware signature for the application,
appending the firmware signature to the second image of the application using a second signed container signed by the firmware to create a third image of the application; and
the firmware consulting the firmware signature to verify whether the application requesting the service from the firmware should be trusted.

10. The computer of claim 8, wherein the trust data further authorizes the application to access services provided by the firmware for a predetermined length of time or a predetermined number of subsequent service requests.

11. The computer of claim 8, wherein the firmware further performs:
in response to the firmware receiving a notification from the application that the application is finished using the service provided by the firmware, the firmware deleting the trust data to prevent the application from subsequently accessing the service provided by the firmware.

12. The computer of claim 8, wherein the firmware does not create either the first or second signature.

13. The computer of claim 8, wherein the operating system further performs:
upon the operating system successfully authenticating the operating system using first signature, the operating system allowing the application to execute; and
upon the operating system determining that the operating system cannot be authenticated using the first signature or that the first signature is not present, the operating system preventing the application from executing.

14. The computer of claim 9, wherein the first and second signed containers are signed using X.509 certificates or Unified Extensible Firmware Interface (UEFI) WIN_CERTIFICATE structures.

15. A method for firmware to determine whether to provide services to an application, comprising:
upon being instructed to execute an application, an operating system determining whether to permit execution of the application by (a) obtaining a first signature of an in-memory image of the application and (b) verifying that the first signature matches a second signature of a persistently stored image of the application;
upon firmware receiving from the application a request for a service provided by the firmware, the firmware determining whether the application should be trusted by (a) verifying that the request originated from the in-memory image of the application and (b) verifying that the second signature of the persistently stored image of the application corresponds to an application which the firmware has previously been notified as being deemed trustworthy;

upon the firmware determining that the application requesting the service from the firmware should be trusted, the firmware storing trust data that permits the application to access the service provided by the firmware; and upon the firmware determining that the application requesting the service from the firmware should not be trusted, the firmware denying performance of the service to the application.

16. The method of claim 15, wherein further comprising:
prior to the execution of the application, performing the steps of:
  creating an operating system signature for the application, wherein the operating system signature is the second signature,
  appending the operating system signature to a first image of the application using a first signed container that is signed by the operating system to create a second image of the application,
  creating a firmware signature for the application,
  appending the firmware signature to the second image of the application using a second signed container signed by the firmware to create a third image of the application; and the firmware consulting the firmware signature to verify whether the application requesting the service from the firmware should be trusted.

17. The method of claim 15, wherein the trust data further authorizes the application to access services provided by the firmware for a predetermined length of time or a predetermined number of subsequent service requests.

18. The method of claim 15, further comprising:
in response to the firmware receiving a notification from the application that the application is finished using the service provided by the firmware, the firmware deleting the trust data to prevent the application from subsequently accessing the service provided by the firmware.

19. The method of claim 15, wherein the firmware does not create either the operating system signature or the firmware signature.

20. The method of claim 15, further comprising:
upon the operating system successfully authenticating the operating system using the first signature, the operating system allowing the application to execute; and
upon the operating system determining that the operating system cannot be authenticated using the first signature or that the first signature is not present, the operating system preventing the application from executing.

* * * * *